United States Patent
Furlanetto et al.

(10) Patent No.: US 9,599,347 B2
(45) Date of Patent: Mar. 21, 2017

(54) SELF-CLEANING FOOD COOKING OVEN

(71) Applicant: Electrolux Professional S.p.A., Pordenone (IT)

(72) Inventors: Riccardo Furlanetto, Musile di Piave (IT); Michele Simonato, Udine (IT); Paolo Cescot, Cordenons (IT)

(73) Assignee: ELECTROLUX PROFESSIONAL S.P.A., Pordenone (IT)

( * ) Notice: Subject to any disclaimer, the term of this patent is extended or adjusted under 35 U.S.C. 154(b) by 692 days.

(21) Appl. No.: 14/025,320

(22) Filed: Sep. 12, 2013

(65) Prior Publication Data
US 2014/0076360 A1 Mar. 20, 2014

(30) Foreign Application Priority Data
Sep. 17, 2012 (EP) .................................... 12184652

(51) Int. Cl.
F24C 14/00 (2006.01)
A21B 3/00 (2006.01)

(52) U.S. Cl.
CPC ............ F24C 14/005 (2013.01); A21B 3/006 (2013.01)

(58) Field of Classification Search
None
See application file for complete search history.

(56) References Cited

U.S. PATENT DOCUMENTS

| | | | | |
|---|---|---|---|---|
| 3,986,891 A | * | 10/1976 | Rumbaugh | A47L 15/44 126/20 |
| 5,499,577 A | * | 3/1996 | Tommasini | F24C 15/327 126/21 A |
| 8,193,470 B1 | | 6/2012 | Harlamert et al. | |
| 2003/0145847 A1 | * | 8/2003 | Deuringer | F24C 14/005 126/377.1 |

(Continued)

FOREIGN PATENT DOCUMENTS

DE 2842771 4/1980
DE 102008025294 12/2009

(Continued)

OTHER PUBLICATIONS

European Search Report for EP12184652.1, dated Dec. 6, 2012.

*Primary Examiner* — Joseph M Pelham
(74) *Attorney, Agent, or Firm* — Pearne & Gordon LLP (57) ABSTRACT

An oven includes a cooking chamber for housing food to be cooked, a control unit, and a reservoir for containing washing detergent at room temperature. The washing detergent has an activation temperature. The oven also includes a liquid supply arrangement selectively activated by the control unit for supplying the washing detergent into the cooking chamber, and one liquid heating element for heating the washing detergent and to be selectively activated by the control unit. During a washing cycle, the control unit performs the following ordered operations: a) activate the one liquid heating element for a first time period sufficient to increase its temperature to the activation temperature; b) deactivate the liquid heating element; c) when the tempera- (Continued)

ture of the liquid heating element is about the activation temperature, activate the liquid supply arrangement so that the washing detergent is heated by the liquid heating element while supplied into the cooking chamber.

16 Claims, 4 Drawing Sheets

(56) References Cited

U.S. PATENT DOCUMENTS

| | | | |
|---|---|---|---|
| 2007/0157920 A1 | 7/2007 | De Miranda Grieco | |
| 2008/0223357 A1* | 9/2008 | Bartelick | B08B 9/00 126/21 A |
| 2009/0178576 A1* | 7/2009 | Valentine | A47J 37/042 99/421 H |
| 2012/0145696 A1 | 6/2012 | Johnson | |

FOREIGN PATENT DOCUMENTS

| | | | |
|---|---|---|---|
| DE | 102008025294 A1 * | 12/2009 | ............ F24C 14/005 |
| EP | 0801271 | 10/1997 | |
| EP | 1146290 | 10/2001 | |
| EP | 1517092 | 3/2005 | |
| EP | 1557612 | 7/2005 | |
| IT | WO 2015056063 A1 * | 4/2015 | ............ F24C 14/005 |
| JP | 2002013738 A * | 1/2002 | |

* cited by examiner

SELF-CLEANING FOOD COOKING OVEN

The present invention relates to the cooking appliances field, and more specifically to self-cleaning cooking devices having a cooking chamber, such as self-cleaning ovens.

Self cleaning ovens are currently known, which are equipped with a cleaning system capable of automatically removing food particles and grease accumulated on the walls of the cooking chamber during the cooking operations.

Known cleaning systems for ovens provide for automatically performing cleaning operations in which washing detergent is sprayed over the walls of the cooking chamber. For example, the cleaning system includes a reservoir adapted to contain the washing detergent and in fluid communication with a pump conduit comprising a pump. Spray nozzles are further connected to an end of the pump conduit for spraying the washing detergent on the walls of the cooking chamber when the pump is in operation. After the spraying of the washing detergent has been carried out, the washing detergent is made to act for a suitable period of time (e.g., depending on the type of washing detergent and/or the amount of food particles to be cleaned up). These two operations may be repeated more than once in sequence. Then, after such washing sequence has been terminated, the washing detergent is removed from the walls of the cooking chamber through rinsing (e.g., by spraying water through the spray nozzles).

In order to achieve an optimal washing action, the washing detergent sprayed on the walls of the cooking cavity should be at a suitable temperature, hereinafter referred to as "activation temperature", which may depend on the chemical composition of the washing detergent itself. For example, enzymatic washing detergents require lower activation temperatures compared with the ones of alkaline washing detergents. Moreover, in order to further improve the whole performance of the cleaning operations, each time the washing detergent is sprayed in the cooking chamber during the washing sequence, the activation temperature may be varied. For example, a typical washing sequence may provide for starting with a relatively low temperature, increasing such temperature until reaching a maximum value, and then decreasing it until reaching a lower temperature. Therefore, the more the temperature profile of the washing detergent is precisely controlled, the better the results of the washing operations.

According to a solution known in the art, the washing detergent is preheated at the reservoir, for example by means of a heating device (e.g., one or more resistive heaters). In this way, the washing detergent may be sprayed into the cooking chamber at the desired activation temperature. However, because of the thermal inertia, once the washing detergent contained in the reservoir has been heated by means of the heating device, it may not be possible to rapidly vary (and especially decrease) the temperature of the washing detergent, failing to follow the optimal temperature profile corresponding to the washing detergent which has been selected.

According to another solution known in the art, the washing detergent contained in the reservoir is left at room temperature during the cleaning operations. In order to heat the washing detergent, according to this solution the cooking chamber is thermo-regulated in such a way to heat the walls. In this way, when the washing detergent at room temperature is sprayed onto the walls, its temperature increases by exchanging heat with the walls, until reaching the activation temperature. However, with this solution it is not possible to control the activation temperature in a precise way, because of the unavoidable temperature oscillations which are typical of a thermo-regulated cooking cavity.

The Applicant has tackled the problem of devising a solution for providing an oven with an improved cleaning system capable of controlling the temperature profile of the washing detergent in a more efficient way compared to the known solutions.

According to an aspect of the present solution, an oven is provided. The oven comprises a cooking chamber for housing food to be cooked, a control unit, and a reservoir for containing a washing detergent at room temperature. The washing detergent has a corresponding activation temperature. The oven further comprises a liquid supply arrangement configured to be selectively activated by the control unit for supplying the washing detergent into the cooking chamber, and at least one liquid heating element configured to heat the washing detergent supplied by the liquid supply arrangement and to be selectively activated by the control unit. During a washing cycle of the cooking chamber, the control unit is configured to perform the following ordered sequence of operations: a) activate the at least one liquid heating element for a first time period sufficient to increase its temperature at least to the activation temperature; b) deactivate the at least one liquid heating element; c) when the temperature of the at least one liquid heating element is about the activation temperature, activate the liquid supply arrangement so that the washing detergent is heated by the at least one liquid heating element while supplied into the cooking chamber.

According to an embodiment of the invention, cooking chamber heating elements configured to be selectively activated by the control unit for heating up the cooking chamber are arranged in the cooking chamber. In this case, the at least one liquid heating element includes the cooking chamber heating elements.

According to an embodiment of the present invention the liquid supply arrangement is configured in such a way that the supplied washing detergent hits the cooking chamber heating elements before reaching walls of the cooking chamber.

According to an embodiment of the present invention, during a washing cycle of the cooking chamber, the control unit is configured to perform a heating phase comprising the operations a) and b), followed by a supply phase comprising the operation c). The control unit is further configured to set the heating phase to last a second time period at least equal to the first time period so that during the supply phase the washing detergent is heated at about the activation temperature when it hits the at least one liquid heating elements.

According to an embodiment of the present invention, the oven further comprises heating elements temperature sensors provided on or in close proximity of the at least one liquid heating element for sensing the temperature thereof. The control unit is further configured to set the first and the second time periods to a substantially same value.

According to an embodiment of the present invention, the control unit is configured to carry out the operation b) as soon as the temperature of the at least one liquid heating element sensed by the heating elements temperature sensors is about the activation temperature.

According to an embodiment of the present invention, the control unit is further configured to set the second time period longer than the first time period.

According to an embodiment of the present invention, the oven further comprises cooking chamber temperature sensors for sensing the temperature of the cooking chamber; the control unit is further configured to carry out the operation b) when the temperature of the cooking chamber sensed by the cooking chamber temperature sensors is about a thermostatic temperature corresponding to a temperature of the at least one liquid heating element higher than the activation temperature.

According to an embodiment of the present invention, the control unit is configured to carry out operation c) after a third time period from the end of operation b); said third time period is set by the control unit so as to made the at least one liquid heating element to cool down, after operation b), until reaching about the activation temperature.

According to an embodiment of the present invention, the liquid supply arrangement comprises a spray nozzle located on a wall of the cooking chamber for the spraying of the washing detergent into the cooking chamber, the at least one liquid heating element including a nozzle heating element surrounding the spray nozzle.

According to an embodiment of the present invention, the control unit is further configured to carry out an action phase after the operation c), in which the washing detergent is made to act on the walls of the cooking chamber.

According to an embodiment of the present invention, the oven further comprises an air propeller; according to this embodiment, during a washing cycle, the sprayed washing detergent is sucked in by the air propeller, causing the washing detergent to be splashed onto the walls of the cooking chamber by the air propeller.

According to an embodiment of the present invention, the oven further comprises a drain connector provided on a bottom wall of the cooking chamber for evacuating the washing detergents.

According to an embodiment of the present invention, the drain connector is coupled with the reservoir through a washing detergent recirculation conduit for allowing the same washing detergent to be reused more than once.

Another aspect of the present invention relates to a method for cleaning an oven. The oven comprises a cooking chamber for housing food to be cooked and a reservoir for containing a washing detergent at room temperature. The washing detergent has a corresponding activation temperature. The oven further comprises a liquid supply arrangement configured to be selectively activated for supplying the washing detergent into the cooking chamber, and at least one liquid heating element configured to heat washing detergent supplied by the liquid supply arrangement and to be selectively activated by the control unit. The method comprises, during a washing cycle of the cooking chamber, performing the following ordered sequence of operations: a) activate the at least one liquid heating element for a first time period sufficient to increase its temperature at least to the activation temperature; b) deactivate the at least one liquid heating element; c) when the temperature of the at least one liquid heating element is about the activation temperature, activate the liquid supply arrangement so that the washing detergent is heated by the at least one liquid heating element while supplied into the cooking chamber.

The following detailed description of exemplary and non-limitative embodiments of the present invention will help to render the above as well as other features and advantages of the present invention clearer. For its better intelligibility, the following description should be read while referring to the attached drawings, wherein.

Figure 1:
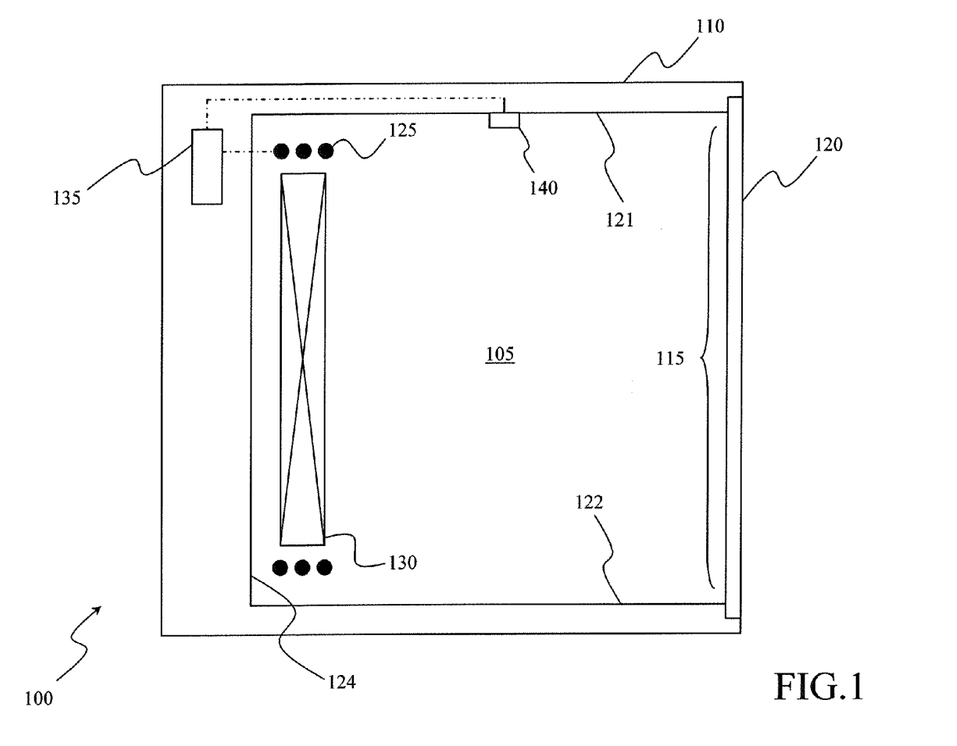
FIG. 1 is a cross-sectional view of an oven wherein a cleaning system according to embodiments of the present invention may be provided.

Referring to FIG. 1, an oven wherein a cleaning system according to embodiments of the present invention may be provided is schematically depicted in a cross-sectional view.

The oven, denoted as a whole with the reference 100, comprises a cooking chamber 105 wherein the foods to be cooked/baked are to be introduced for being cooked.

The cooking chamber 105 is a delimited region of space within an oven cabinet 110 having a front opening 115 for inserting/removing the foods. The front opening is closable by an oven door 120, hinged to the oven cabinet 110 so as to be movable by an oven user between a closed position (depicted in figure) adapted to close the front opening 115, and an open position (not depicted in figure) in which the cooking chamber 105 is accessible through the front opening 115. The cooking chamber 105 includes an upper wall 121, a lower wall 122, two opposite side walls (not visible in figure) and a back wall 124 opposite to the front opening 115.

The oven 100 further includes heating elements 125, for example one or more resistive heaters, positioned in the interior of the cooking chamber 105, and energizable for heating up the cooking chamber environment.

An air propeller 130, preferably a fan, is also provided in the cooking chamber 105, preferably inside (more preferably, in the center of) the region delimited by the heating elements 125, in such a way that the former is surrounded by the latter. The air propeller 130 is operable (possibly in a selective way, depending on a food cooking program selected by the oven user) to cause air circulation within the cooking chamber 105 so as to better distribute the air heated up by the heating elements 125 and achieve a more uniform temperature inside the cooking chamber 105. The heating elements 125 and the air propeller 130 are advantageously located in the back portion of the cooking chamber 105, i.e., close to the back wall 124.

Additional heating elements (not illustrated) might be arranged in further locations of the cooking chamber 105, e.g., at the top and/or at the bottom thereof.

A control unit 135 is provided, which is configured to control the operation of the oven 100. The control unit 135 is operably interfaced with sensor devices of the oven 100 for receiving therefrom sensed data, and with actuator devices of the oven 100 for controlling their activation. For example, the sensor devices may include one or more cooking chamber temperature sensors 140 (e.g., thermocouples) adapted to sense the temperature of the cooking chamber 105, and the actuator devices may include the heating elements 125 and the air propeller 130. The control unit 135 is further operably interfaced with a control panel (not shown) through which an user of the oven 100 may turn on/off the oven, select a particular cooking program, and set parameters affecting the cooking operations, such as the cooking temperature.

For example, if a user sets a specific cooking program with a specific temperature Tc through the control panel, the control unit 135 turns on the heating elements 125 to increase the temperature of the cooking chamber 105 and, if required by the selected cooking program, activates the air propeller 130. The control unit 135 regulates the temperature of the cooking chamber 105 about a thermostatic temperature Tt corresponding to the desired cooking temperature Tc through a thermostatic feedback control by turning on and off the heating elements 125 based on the actual cooking chamber temperature monitored by the cooking chamber temperature sensors 140. For example, the heating elements 125 are turned off when the temperature of the cooking chamber 105 exceeds the thermostatic temperature Tt by a first amount, and are turned on when the temperature cooking chamber 105 falls below the thermostatic temperature Tt by a second amount.

The control unit 135 may include a printed circuit board on which various electronic and electric circuits are formed. Although the control unit 135 is depicted in the figures as a single, concentrated, block, similar considerations apply if some of its circuits are located in different portions of the oven 100.

Figure 2:
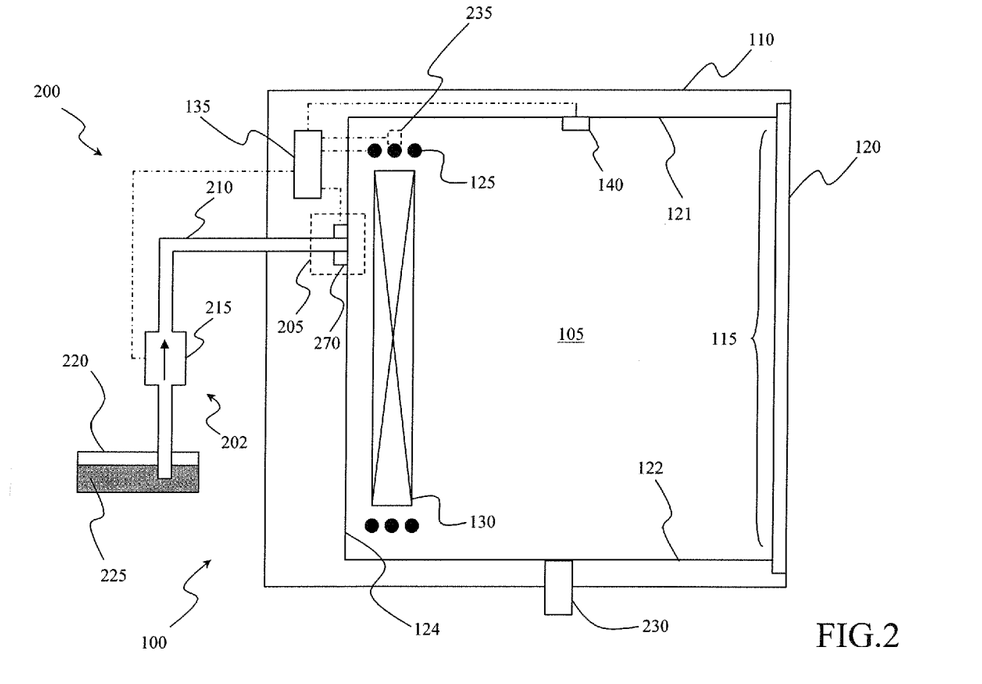
FIG. 2 is a cross-sectional view of the oven of FIG. 1 equipped with a cleaning system according to an embodiment of the present invention.

FIG. 2 schematically depicts in a cross-sectional view the oven 100 equipped with an automatic cleaning system 200 according to an embodiment of the present invention.

The cleaning system 200 comprises a liquid spray arrangement 202 adapted to spray liquids, such as water and washing detergents, into the cooking chamber 105. The liquid spray arrangement 202 comprises a spray nozzle 205 located on the back wall 124 of the cooking chamber 105. According to an embodiment of the present invention, the position of the spray nozzle 205 on the back wall 124 is such that the liquid sprayed from the spray nozzle 205 is sucked by the air propeller 130, and then splashed on the walls of the cooking cavity by the latter.

The liquid spray arrangement 202 further comprises a pump conduit 210 having a pump 215, which creates a connection between the spray nozzle 205 and a reservoir 220 adapted to contain water and washing detergents 225. It has to be underlined that the reservoir 220 is not heated, and the washing detergents 225 included therein are at room temperature. The pump 215 is selectively energizable by the control unit 135 for allowing the liquid included in the reservoir to be sprayed in the cooking chamber 105 through the spray nozzles 205.

The cleaning system 200 is configured to execute, under the control of the control unit 135, cleaning operations directed to remove food particles and grease accumulated on the walls of the cooking chamber 105 during the cooking operations.

Figure 3:
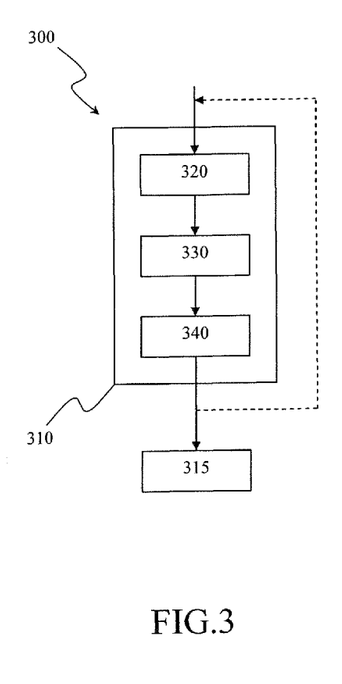
FIG. 3 is a flow chart illustrating main phases of a washing cycle executable by the cleaning system of FIG. 2 according to an embodiment of the present invention.

Making reference to the flow chart illustrated in FIG. 3, the cleaning system 200 is in particular configured to carry out a washing cycle 300 comprising a washing stage 310, possibly followed by one or more reiterations thereof, and a rinsing stage 315.

According to an embodiment of the present invention, a washing stage 310 is structured in turn as a three-phase ordered sequence, comprising:

1) A heating phase 320, having a whole duration th, during which the heating elements 125 are activated for a heating elements activation time ton≤th in such a way to increase their temperature. At the end of the heating phase, the heating elements 125 are in a off condition. As will be described in detail in the following of the description, the heating phase 320 is calibrated in such a way that at the end thereof the heating elements are at a temperature at least corresponding to the activation temperature Ta of the washing detergent 225 that is employed. Moreover, during this phase, or at the beginning of the next one, the air propeller 130 is activated.

2) A supply phase 330, having a duration ts, carried out with the heating elements 125 that are off, wherein the pump 215 is activated so as to spray the washing detergent 225 included in the reservoir 220 through the spray nozzle 205. Since, as mentioned above, the reservoir 220 is not heated, the washing detergent 225 is sprayed from the spray nozzle 205 at room temperature. The sprayed washing detergent 225 is sucked by hits the air propeller 130, which is in motion. Therefore, the air propeller 130 causes the washing detergent 225 to be splashed on the (dirty) walls of the cooking chamber 105. Since the heating elements 125 surround the air propeller 130, the washing detergent 225 enters into contact with the heating elements 125 themselves before reaching the walls of the cooking chamber 105. In this way, the washing detergent 225 exchanges heat with the heating elements, reaching a temperature corresponding to the activation temperature Ta. At the end of this phase, the pump 215 is turned off, interrupting the supply of washing detergent 225.

3) An action phase 340, having a duration ta, in which the washing detergent 225 is made to act on the walls of the cooking chamber 105.

This solution allows to heat up the washing detergent by advantageously exploiting the thermal inertia of the system. Indeed, with this solution, the washing detergent 225 is sprayed onto the heating elements 125 that—although at about the activation temperature Ta—are however turned off. This is particularly useful in case the washing detergent 225 employed is such to lose its washing efficiency when "burned" at too high temperatures, such as for example in case of enzymatic washing detergents.

As mentioned above, the washing stage 310 may be reiterated. Before carrying out each washing stage 310, the reservoir 220 may be filled with the washing detergent 225. Different washing detergents 225 may be used each time the washing stage 310 is reiterated within a same washing cycle. Moreover, each time a washing stage 310 is reiterated, it is possible to change one or more operative parameters, such as the duration th of the heating phase, the heating elements activation time ton, the duration is of the spraying phase, and/or the temperature Ta the heating elements 125 are brought to, for example based on the washing detergent 225 employed in such reiteration. For example, a first washing stage 310 may be carried out exploiting an enzymatic washing detergent 225 and a subsequent washing stage 310 may be carried out exploiting an alkaline washing detergent 225. In this exemplary case, the first washing stage 310 may be carried out with a relatively short duration th of the heating phase, while the second washing stage 310 with a longer duration th of the heating phase.

The rinsing stage 315 is carried out by filling the reservoir 220 with rinsing liquid, e.g., water, and then turning on the pump 215, in such a way that rinsing liquid is sprayed on the walls of the cooking chamber 105.

In the embodiment of the invention illustrated in FIG. 2, a drain connector 230 is provided on the lower wall 122 of the cooking chamber 105 through which the washing detergents, the food particles and the rinsing water are evacuated.

Figure 4:
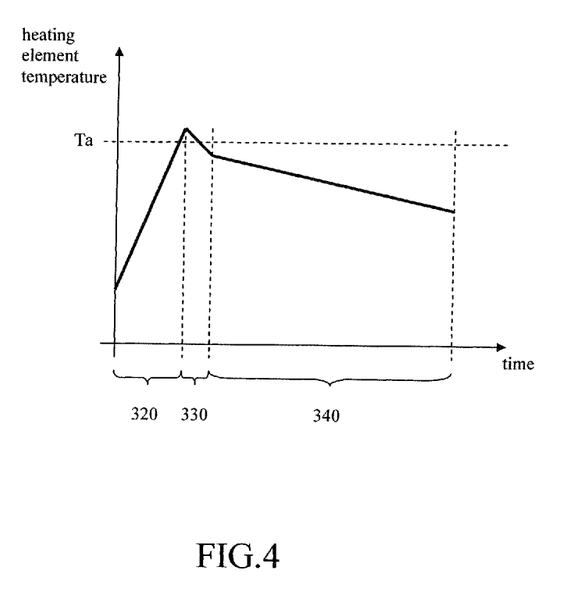
FIG. 4 is a time diagram illustrating the evolution in time of the temperature of heating elements during a generic washing stage of the washing cycle of FIG. 3 according to an embodiment of the present invention.

According to an embodiment of the present invention, the control unit 135 is further interfaced with heating elements temperature sensors 235 (e.g., thermocouples) provided on or in close proximity of the heating elements 125, and adapted to sense the temperature of the heating elements 125. In this way, it is possible to directly monitor the temperature of the heating elements 125. In order to describe in greater detail how the cleaning system 200 according to this embodiment of the invention operates, reference is now made to the time diagram of FIG. 4, which illustrates the evolution in time of the heating elements 125 temperature during a generic washing stage 310. The control unit 135 activates the heating elements 125 at the beginning of the heating phase 320, and keeps them activated until their temperature (which is directly monitored through the heating elements temperature sensors 235) reaches a temperature corresponding to the activation temperature Ta of the washing detergent 225; then, the control unit 135 deactivates the heating elements, and the heating phase 320 is terminated. In this case, the heating elements 125 are turned on for a heating elements activation time ton substantially corresponding to the whole duration th of the heating phase. Therefore, at the beginning of the supply phase 330, when the control unit 135 turns on the pump 215 for triggering the spraying of washing detergent 225, the heating elements 125 (which are off) are just at about the activation temperature Ta. During the supply phase, washing detergent 225 is sprayed through the spray nozzles 205. Before reaching the walls of the cooking chamber 105, the washing detergent 225 hits the heating elements 125 and increases its temperature up to about its activation temperature Ta. During this phase the temperature of the heating elements 125 decreases, since heat exchange occurs between the washing detergent 225 that is being sprayed and the heating elements 125. However, if the duration is of the supply phase 330 is sufficiently short, the effect of such decrease in temperature of the heating elements 125 (and, therefore, of the washing detergent 225 that enters into contact with the walls of the cooking chamber) on the washing performances may be considered negligible. During the subsequent action phase 340, both the heating elements 125 and the pump 215 are off, and the temperature of the heating elements 125 slightly decreases because of the heat exchange with the environment.

The possibility of providing heating elements temperature sensors on or in close proximity of the heating elements 125—such as the heating elements temperature sensors 235—is not always available. Therefore, according to another embodiment of the present invention, the heating phase 320 is carried out by exploiting the actual temperature of the cooking chamber 105 sensed by the cooking chamber temperature sensors 140 and relationships occurring among the thermostatic temperature Tt which the temperature of the cooking chamber 105 is set to by the control unit 135, the heating elements activation time ton, the temperature of the heating elements 125, and the duration th of the heating phase 320. Said relationships are for example determined in an empirically way, and depend on several factors, such as the size and the type of the cavity chamber, the size and the type of the heating elements, the position of the latter in the former and so on. Indeed, the thermostatic temperature Tt depends on the way the heating elements 125 are activated, i.e., depends on the heating elements activation time ton.

According to this embodiment of the invention, at the beginning of the heating phase 320 the control unit 135 sets a thermostatic temperature Tt, generally lower than the desired activation temperature Ta of the washing detergent 225. Therefore, the control unit 135 turns on the heating elements 125 until the actual cooking chamber temperature monitored by the cooking chamber temperature sensors 140 reaches such thermostatic temperature Tt. At this point, the heating elements 125 are at a temperature higher than the thermostatic temperature Tt (in order to bring a cavity to a specific cavity temperature by means of heating elements, such heating elements should be at a temperature higher of the cavity temperature), and generally higher than the desired activation temperature Ta. Thus, unlike the previous embodiment of the present invention, wherein the heating elements 125 are turned on for a heating elements activation time ton substantially corresponding to the whole duration th of the heating phase, the control unit 135 turns off the heating elements 125, but does not trigger the beginning of the subsequent supply phase 330, i.e., the heating phase 320 is made to last a time duration th higher than the heating elements activation time ton. According to this embodiment of the invention, the whole duration th of the heating phase 320 is calibrated in such a way to make the heating elements 125 to cool down—after their deactivation—until reaching about the desired activation temperature Ta, in such a way that at the beginning of the following supply phase 330 the sprayed washing detergent 225 is still heated at about the activation temperature Ta when entering in contact with the heating elements 125. According to this embodiment, when the control unit 135 regulates the temperature of the cooking chamber 105 about a thermostatic temperature Tt, the duration th of the heating phase 320 and the heating elements activation time ton should be carefully set in such a way to avoid that, after the deactivation of the heating elements 125, the thermostatic feedback control carried out by the control unit 315 causes a further activation of the heating elements 125 when the heating phase 320 is not finished yet—this may occur if the temperature of the cooking chamber falls below the thermostatic temperature Tt beyond a threshold. In this way, it is avoided that the washing detergent 225 is sprayed with the heating elements 125 still activated, at the same time reducing the power consumptions.

An exemplary washing stage 310 exploiting an enzymatic washing detergent 225 according to this embodiment of the invention may for example provide for setting a thermostatic temperature Tt of 40° C., with a duration th of the heating phase 320 of about 3 minutes and a duration is of the supply phase 330 of about 20 seconds.

Figure 5:
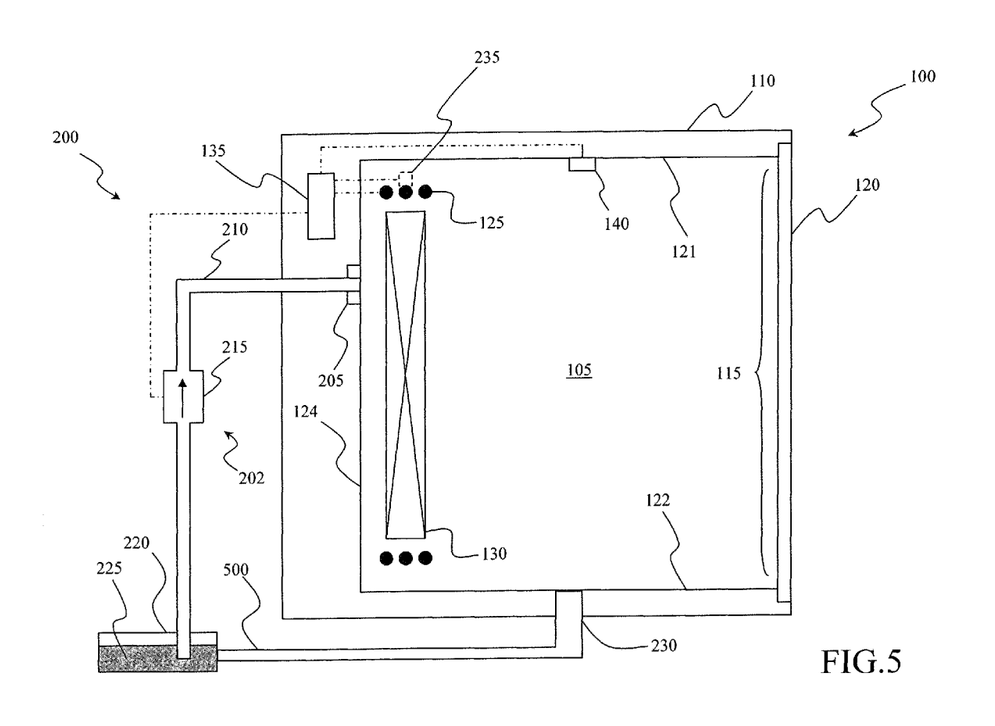
FIG. 5 is a cross-sectional view of the oven of FIG. 1 equipped with a cleaning system according to another embodiment of the present invention.

According to another embodiment of the invention illustrated in FIG. 5, the cleaning system 200 further comprises a washing detergent recirculation conduit 500 coupling the drain connector 230 with the reservoir 220 in order to allow the same washing detergent to be used in more than one washing stage 310.

Turning back to FIG. 2, according to a further embodiment of the present invention, instead of heating the washing detergent by means of the heating elements 125 normally used for heating up the cooking chamber environment, the washing detergent is heated by means of a nozzle heating element 270 (e.g., including resistive heaters) coupled to (for example surrounding) the spray nozzle 205. The nozzle heating element 270 is configured to be selectively energized by the control unit 135, and is equipped with a temperature sensor (not illustrated) directly provided on or in close proximity of the nozzle heating element 270 for sensing the temperature of the latter. In this case, during each washing stage 310, the heating elements 125 are kept always off. During the heating phase 320, the nozzle heating element 270 is turned on until its temperature has reached a temperature substantially equal to the activation temperature Ta. As soon as such temperature is reached, the nozzle heating element 270 is turned off, and the heating phase 320 is finished. Then, the supply phase 330 is initiated, with the nozzle heating element 270 that is off and the pump is activated so as to spray the washing detergent 225 included in the reservoir 220 by the spray nozzle 205. Before reaching the cooking chamber 105, the washing detergent 225 exchanges heat with the nozzle heating element 270, reaching a temperature corresponding to the activation temperature Ta. At the end of this phase, the pump 215 is turned off, interrupting the supply of washing detergent 225. Then, the action phase 340 is performed so as to allow the washing detergent 225 to act on the walls of the cooking chamber 105.

It has to be appreciated that, in all the embodiments of the invention herein described, the washing detergent is heated upon the spraying, i.e., just after the washing detergent reaches the cooking chamber (by means of the heating elements located in the cooking chamber) or at the nozzle (by means of the nozzle heating element), thus avoiding to preheating the washing detergent at the reservoir. In this way, the drawbacks caused by the relatively high thermal inertia typical of a great amount of liquid—such as the amount of washing detergent accumulated in the reservoir—are avoided.

In the foregoing, exemplary embodiments of the present invention have been presented and described in detail. Several modifications to the described embodiment, as well as alternative ways of practicing the invention are conceivable, without departing form the protection scope defined by the appended claims.

For example, although in the detailed description reference has been made to heating elements comprising resistive heaters, similar considerations apply in case different heating elements are used, such as for example comprising gas heating elements.

Moreover, the number and the positions of the spray nozzles may be varied, provided that the washing detergent sprayed therefrom is such to hit the heating elements before reaching the walls of the cooking cavity.

Although in the description reference has been made to a liquid spray arrangement including a spray nozzle, the concepts of the present invention may be also applied in the case in which, instead of a spray nozzle, a simple hole (provided on the back wall of the cooking chamber) is used to introduce the washing detergent 225 into the cooking chamber 105, since in any case a nebulization action is performed by the air propeller 130.

The invention claimed is:

1. An oven comprising:
   a cooking chamber for housing food to be cooked;
   a control unit;
   a reservoir for containing a washing detergent at room temperature, the washing detergent having a corresponding activation temperature;
   a liquid supply arrangement configured to be selectively activated by the control unit for supplying the washing detergent into the cooking chamber; and
   at least one liquid heating element configured to heat the washing detergent supplied by the liquid supply arrangement and to be selectively activated by the control unit,
   wherein during a washing cycle of the cooking chamber, the control unit is configured to perform the following ordered sequence of operations:
   a) activate the at least one liquid heating element for a first time period sufficient to increase its temperature at least to the activation temperature;
   b) deactivate the at least one liquid heating element;
   c) activate the liquid supply arrangement when the temperature of the at least one liquid heating element is about the activation temperature, so that the washing detergent is heated by the at least one deactivated liquid heating element while supplied into the cooking chamber to act on the walls of the cooking chamber.

2. The oven of claim 1, wherein:
   the at least one liquid heating element includes a cooking chamber heating element that is configured to be selectively activated by the control unit for heating up the cooking chamber, and the cooking chamber heating element is arranged in the cooking chamber.

3. The oven of claim 2, wherein the liquid supply arrangement is configured in such a way that the supplied washing detergent hits the cooking chamber heating element before reaching walls of the cooking chamber.

4. The oven of claim 1, wherein, during the washing cycle of the cooking chamber, the control unit is configured to perform a heating phase comprising the operations a) and b), followed by a supply phase comprising the operation c), the control unit being further configured to set the heating phase to last a second time period at least equal to the first time period so that during the supply phase the washing detergent is heated at about the activation temperature when it hits the at least one liquid heating elements.

5. The oven of claim 4, further comprising heating elements temperature sensors provided on or in close proximity of the at least one liquid heating element for sensing the temperature thereof, the control unit being further configured to set the first and the second time periods to a substantially same value.

6. The oven of claim 5, wherein the control unit is configured to carry out the operation b) as soon as the temperature of the at least one liquid heating element sensed by the heating elements temperature sensors is about the activation temperature.

7. The oven of claim 4, wherein the control unit is further configured to set the second time period longer than the first time period.

8. The oven of claim 7, further comprising cooking chamber temperature sensors for sensing the temperature of the cooking chamber, the control unit being further configured to carry out the operation b) when the temperature of the cooking chamber sensed by the cooking chamber temperature sensors is about a thermostatic temperature corresponding to a temperature of the at least one liquid heating element higher than the activation temperature.

9. The oven of claim 8, wherein the control unit is configured to carry out operation c) after a third time period from the end of operation b), said third time period being set by the control unit so as to made the at least one liquid heating element to cool down, after operation b), until reaching about the activation temperature.

10. The oven of claim 1, wherein the control unit is further configured to carry out an action phase after the operation c), in which the washing detergent is made to act on the walls of the cooking chamber.

11. The oven of claim 1 further comprising an air propeller, wherein, during a washing cycle, the sprayed washing detergent is sucked in by the air propeller, causing the washing detergent to be splashed onto the walls of the cooking chamber by the air propeller.

12. The oven of claim 1, further comprising a drain connector provided on a bottom wall of the cooking chamber for evacuating the washing detergents.

13. The oven of claim 12, wherein the drain connector is coupled with the reservoir through a washing detergent recirculation conduit for allowing the same washing detergent to be reused more than once.

14. The oven of claim 1, wherein the washing detergent remains liquid during the washing cycle.

15. An oven comprising:
a cooking chamber for housing food to be cooked;
a control unit;
a reservoir for containing a washing detergent at room temperature, the washing detergent having a corresponding activation temperature;
a liquid supply arrangement configured to be selectively activated by the control unit for supplying the washing detergent into the cooking chamber; and
at least one liquid heating element configured to heat the washing detergent supplied by the liquid supply arrangement and to be selectively activated by the control unit,
wherein during a washing cycle of the cooking chamber, the control unit is configured to perform the following ordered sequence of operations:
a) activate the at least one liquid heating element for a first time period sufficient to increase its temperature at least to the activation temperature;
b) deactivate the at least one liquid heating element; and
c) activate the liquid supply arrangement when the temperature of the at least one liquid heating element is about the activation temperature, so that the washing detergent is heated by the at least one liquid heating element while supplied into the cooking chamber,
wherein the liquid supply arrangement comprises a spray nozzle located on a wall of the cooking chamber for the spraying of the washing detergent into the cooking chamber, and the at least one liquid heating element includes a nozzle heating element surrounding the spray nozzle.

16. A method for cleaning an oven of claim 1, the method comprising the following ordered sequence of operations:
a) activate the at least one liquid heating element for the first time period sufficient to increase its temperature at least to the activation temperature;
b) deactivate the at least one liquid heating element;
c) activate the liquid supply arrangement when the temperature of the at least one liquid heating element is about the activation temperature, so that the washing detergent is heated by the at least one deactivated liquid heating element while supplied into the cooking chamber to act on the walls of the cooking chamber.

* * * * *